United States Patent [19]
Adams

[11] 3,904,847
[45] Sept. 9, 1975

[54] HEATING STRUCTURE

[75] Inventor: Gerald E. Adams, Mishawaka, Ind.

[73] Assignee: Easy Heat-Wirekraft, MSP Industries Corporation, Lakeville, Ind.

[22] Filed: June 26, 1974

[21] Appl. No.: 483,226

[52] U.S. Cl. ............... 219/213; 219/345; 219/538
[51] Int. Cl. ............................................. H05b 1/00
[58] Field of Search ........... 219/213, 538, 544, 552, 219/553, 345

[56] References Cited
UNITED STATES PATENTS
| | | | |
|---|---|---|---|
| 3,209,128 | 9/1965 | Chapman, Jr. | 219/213 X |
| 3,356,835 | 12/1967 | Watson | 219/2.3 X |
| 3,418,448 | 12/1968 | Predenas | 219/213 |

Primary Examiner—C. L. Albritton
Attorney, Agent, or Firm—Marmaduke Hobbs

[57] ABSTRACT

A heating structure for embedding in pavement and the like, having a heating wire with a resistance wire therein and a layer of thermoplastic material surrounding the resistance wire, the heating wire being arranged in a predetermined configuration of spaced sections interconnected to one another at their ends and defining open areas through which the material of the pavement or the like will readily pass. A plurality of strands of thermoplastic material interconnect the spaced sections of heating wire to hold the sections in the predetermined configuration. The thermoplastic material surrounding the resistance wire and the strands are preferably of the same plastic material, and a core may be provided in the strands to prevent any appreciable stretching thereof, and the heating wire preferably has a layer of insulating material around the resistance wire and a braided wire shield interposed between the insulating layer and the layer of thermoplastic material.

9 Claims, 7 Drawing Figures

PATENTED SEP 9 1975　3,904,847

HEATING STRUCTURE

In recent years, snow and ice have been melted from pavement, walks, steps, runways and the like by embedding heating wire in the pavement or other structure, usually beneath an inch or two of paving material, to maintain the surface above the freezing point. Individual, single-strand heating wires laid back-and-forth in the pavement have been used to a limited extent; however, this type of heating installation is difficult and time consuming to make and may result in a heterogeneous pavement structure. More recently, heating structures have been used, consisting of a metal wire, fiber glass or plastic mesh on which is mounted an insulated heating wire secured in a predetermined pattern, usually in spaced straight, parallel strands with curved connecting ends. The units constructed of wire mesh are effectively grounded by the mesh, thus providing adequate safety for persons using the installation. Since the units utilizing plastic mesh cannot effectively be grounded through the mesh, a braided wire layer is provided in the heating wire structure which is connected to a suitable ground wire and is insulated from the resistance heating wire and from direct contact with the matrix in which it is embedded. The heating wire, whether mounted on wire or plastic mesh, is secured to the spaced wires or strands of the mesh to form an integral structure therewith which can be installed in place as a unit in pavement or other structure. While the mesh holds the heating wire in the desired pattern, the strands of the mesh often are close together, and hence the unit is uneconomical to produce and interferes with the installation of the pavement and unnecessarily increases the overall cost. It is therefore one of the principal objects of the present invention to provide a heating structure having the heating wire with an outer layer of insulating material and having separate strands of plastic material joined to the insulating layer by a heat sealing procedure to retain the heating wire in a predetermined pattern, and to form an open-type structure through which the material of the pavement or the like will readily pass during installation of the unit.

Another object of the invention is to provide a heating unit of the foregoing type, in which the heating wire is effectively shielded from damage, abrasion, nicks and cuts to which it may be subjected during fabrication, installation and operation of the heating unit, and which can readily and easily be arranged and retained in a predetermined pattern.

A further object is to provide a rugged, versatile heating structure which can be bent or flexed into various configurations with numerous and intricate curved portions, and which is highly flexible and adapted to conform readily and fully to any contoured structure in which it is embedded.

Another object of the invention is to provide a heating structure of the aforesaid type which is simple and economical in construction, and which can easily be fabricated, shipped and installed.

Additional objects and advantages of the invention will become apparent from the following description and accompanying drawings, wherein.

Figure 1:
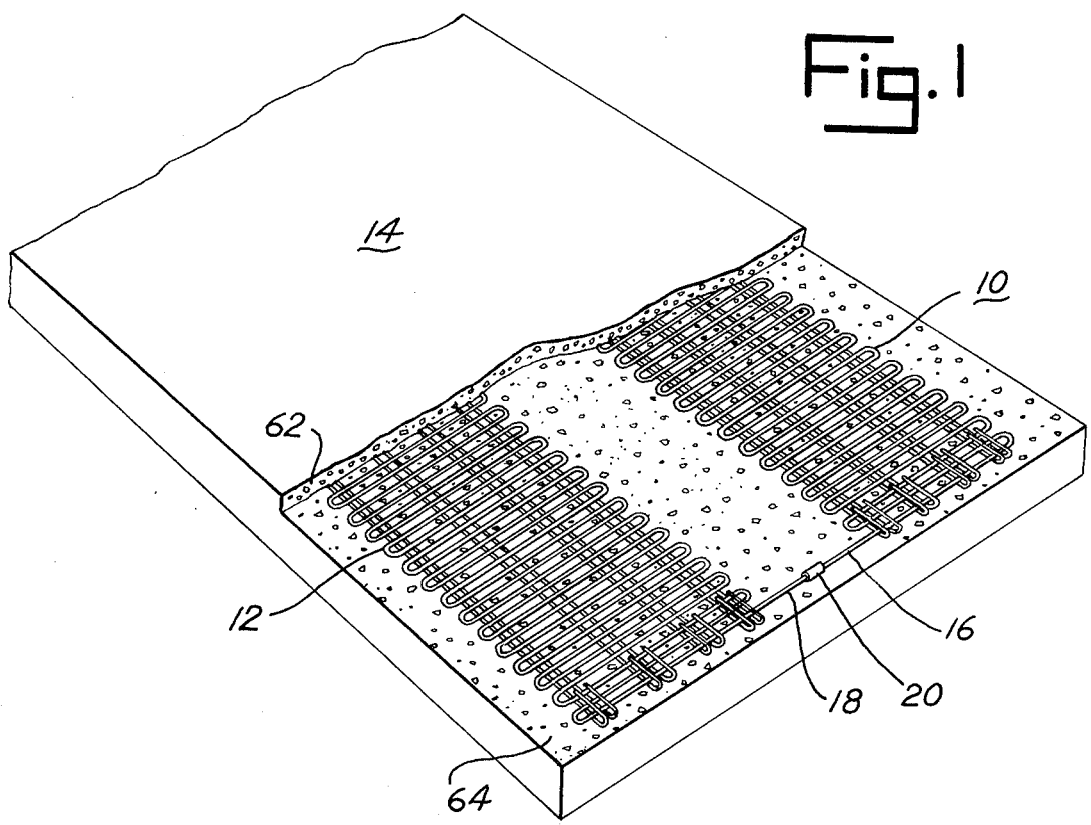
FIG. 1 is a perspective view of a slab of concrete, such as a driveway, with a portion broken away to illustrate the installation of the present heating structure and system embedded therein.

Referring more specifically to the drawings, and to FIG. 1 in particular, numerals 10 and 12 indicate heating structures embedded in a concrete slab 14, such as a driveway, the two heating elements being located to melt snow and ice from the surface of the slab in the area of the treads of an automobile using the driveway. The two heating units 10 and 12 are connected to one another by lead wires 16 and 18, respectively, and a connector 20. Leads, not shown, connect the units to a source of power, normally controlled by a switch in the garage or home. While the units in the present heating structures are illustrated for melting snow and ice on a driveway, they are adaptable to a variety of different uses, including melting of snow and ice on sidewalks, steps, ramps, courts and runways, and embedment in dirt beneath floors and the like, the present invention being readily adaptable to these various uses without any appreciable modification in the basic structure.

Figure 6:
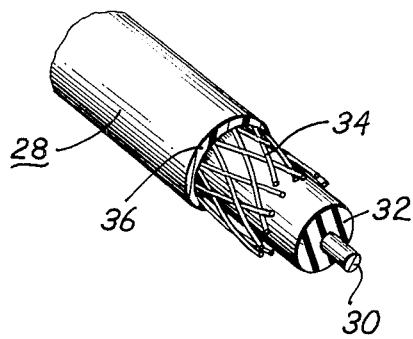
FIG. 6 is an enlarged fragmentary, partial cross sectional view of the heating wire utilized in the present heating structure.
Figure 4:
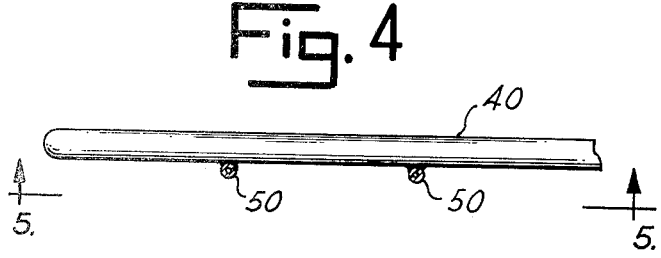
FIG. 4 is a cross sectional view of the heating structure, the section being taken on line 4 — 4 of FIG. 3.
Figure 7:
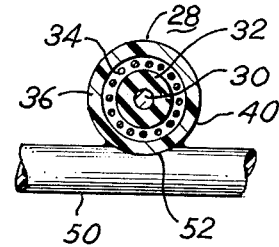
FIG. 7 is an enlarged fragmentary cross sectional view of the heating structure, the section being taken on line 7 — 7 of FIG. 3.
Figure 5:
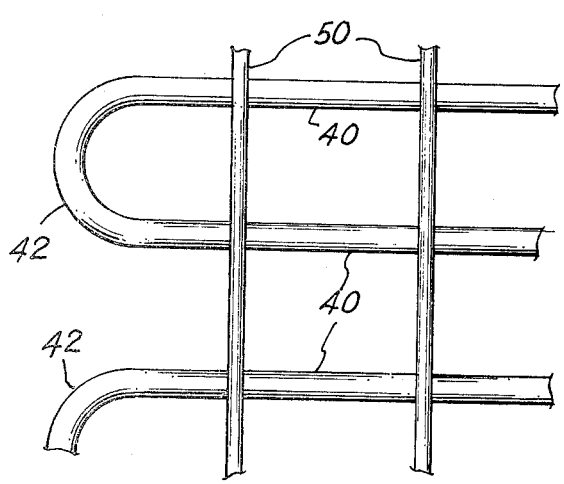
FIG. 5 is a fragmentary plan view of the side opposite that shown in FIG. 3.

The heating wire 28 used in the present heating structure is best illustrated in FIGS. 6 and 7, and consists of a resistance wire 30 of any suitable composition, an inner insulating layer 32, preferably of plastic, fully sealing resistance wire 30, a flexible shield 34 of metal wire, preferably copper wire, tightly woven around layer 32 and surrounded by an outer layer 36, preferably of substantial thickness. The braided wire forms a ground in the event a short develops in the heating wire, and while a braided structure is preferred, in that it forms a shield to protect the wire against cuts, knicks, and abrading, other configurations besides braiding may be used if they form a suitable ground in the event of a short. It is constructed of relatively fine wire so that it will not interfere with the overall flexibility of the wire. Layer 32 may be of any suitable flexible material such as plastic or rubber and the outer layer is thermoplastic material, preferably polyvinyl chloride. In fabricating the wire structure, the inner insulating layer 32 is first extruded onto wire 30, and after it has fully set, wire 34 is braided tightly onto the external surface of the insulation. Thereafter, the outer insulation 36 of thermoplastic material is extruded onto the braided structure, normally forming an effective bond therewith. While the heating wire has been described in detail herein, various changes and other structures may be used in the present heating unit; however, the form described is the preferred embodiment thereof, and the composition of outer layer 36 may be critical, as will be more fully explained hereinafter.

Figure 2:
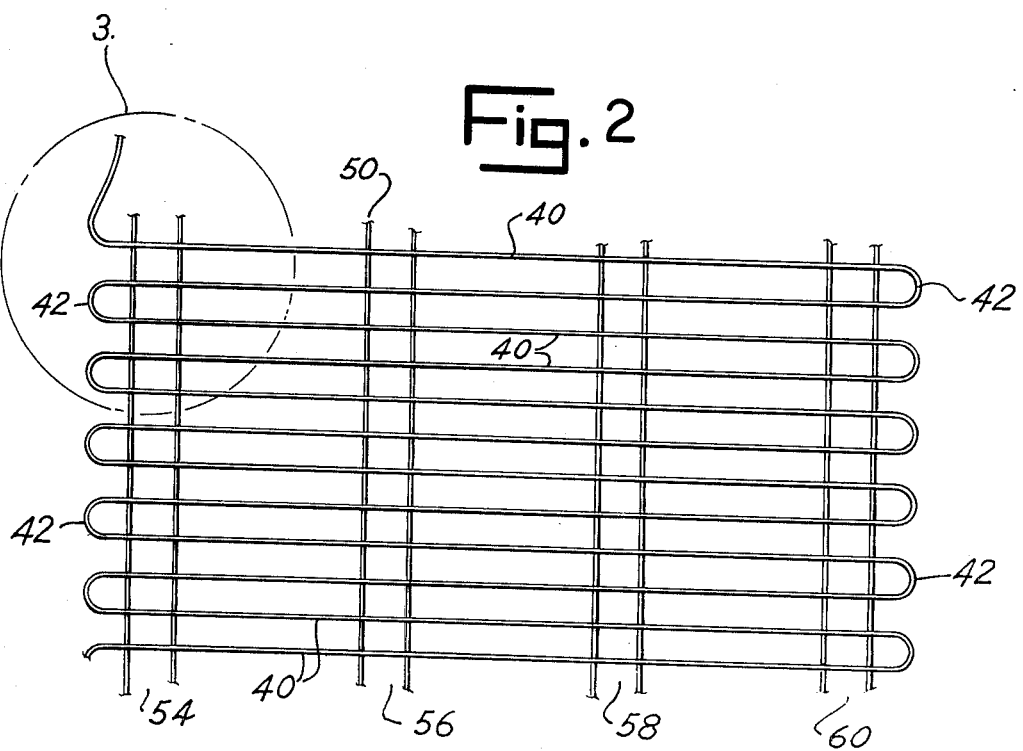
FIG. 2 is a top plan view of a heating structure embodying the present invention.
Figure 3:
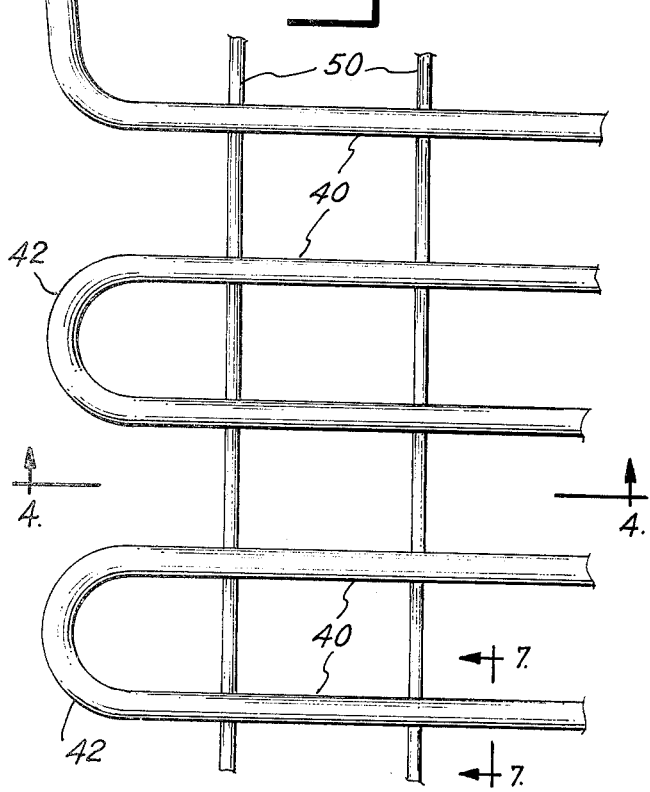
FIG. 3 is an enlarged fragmentary plan view of the heating structure shown in the preceding figures, the fragmentary portion being indicated at numeral 3 in FIG. 2.

In the fabrication of the heating structure, heating wire 28 is arranged in a predetermined pattern, normally using a board or table with two rows of pegs around which the wire is looped to make a configuration such as that shown in FIG. 2. The parallel sections 40 normally would be all of the same length, but they may be different in special installations to provide portions where the heating wire is not required or is undesirable. The elongated sections 40 are connected to one another by curved or looped portions 42 so that a continuous heating wire is normally used from one end of the heating structure to the other. However, for some installations, a series of sub-sections may be desirable, the sub-sections being connected to one another in a manner similar to that illustrated at numerals 16, 18 and 20 in FIG. 1.

One of the advantages of the present heating structure is the manner in which the sections of the heating wire are retained in the desired configuration without using any structure in excess of that required to perform the operation, and hence an effective heating structure is provided which can readily be embedded in the concrete without its interfering with a homogeneous structure in the matrix on opposite sides and through the heating structure. The present invention utilizes a plurality of strands 50 of the thermoplastic material which is compatible with the thermoplastic material forming the outer layer 36 of the heating wire, such that an effective bond is formed between the strands and layer 36 as illustrated at numeral 52 in FIG. 7. When the strands are pressed onto the external surface of layer 36 and with an application of heat thereto at a temperature sufficiently high to cause a superficial fusion, a bond such as that illustrated at numeral 52 is formed which will effectively hold the heating wire and strands together. Preferably, the outer layer 36 of the heating wire and strands 50 are constructed of polyvinyl chloride, and an effective bond between the two can be obtained by pressing them together after the adjacent surfaces of each have been fused at an elevated temperature, usually at a temperature of between 340° and 700°F, depending upon the time at which they are subjected to the elevated temperature. The strands may be of various sizes, such as one sixteenth to one eighth of an inch in diameter, and are normally round in cross section. The strands are also preferably reinforced by a wire of fiber glass core which prevents the strands from stretching while the heating structure is being handled, thus forming a firm structure which retains the desired configuration.

In the embodiment illustrated in FIGS. 1 and 2, eight strands, arranged in pairs 54, 56, 58 and 60, have been used, thus leaving a substantial amount of unobstructed space through which the matrix can flow when the final layer 62 of the concrete slab or other matrix is applied after the heating units have been assembled in place on the base layer 64. The two layers 62 and 64 form a homogeneous structure when the slab has been finally completed, with the heating element embedded therein.

In the fabrication and use of the present heating wire structure, the heating wire is fabricated in the manner described and is laid out on a board, table or similar carriage, in the configuration desired, such as the parallel and curved sections 40 and 42, shown best in FIG. 2. While the heating wire is held by pegs, the strands are preferably on spools disposed above the carriage, and the carriage or the spools are moved over the heating wire configuration and, while in transit, the strands from the spool are pressed firmly against the surface of the heating wire while a heating element applies heat to the strands at a temperature high enough to cause the thermoplastic material of the strands and the outer layer 36 of the heating wire to fuse sufficiently to become bonded to one another as seen at numeral 52 in FIG. 7. As the table or carriage with the heating wire configuration thereon moves, for example, beneath the spools, one spool for each strand, the strands are successively secured to the parallel sections 40 to form an integral unit between the heating wire and the strands, the strands holding the sections 40 in spaced relation and in the configuration desired. The operation may be continuous, with the heating structure being cut into units or sections of the desired length and folded or rolled for storage and shipping.

One end of the heating wire is preferably connected to an outlet adjacent the other end of the heating wire, preferably by a cold lead. When the heating structure is to be installed, the base layer 64 of the concrete, asphalt or other material is laid, and the heating structure is laid on the surface of the base layer. A number of units of the heating structure may be placed on the surface and connected to one another, illustrated at numerals 16, 18 and 20. After the heating units have been wired for electricity from a suitable source, the final layer 62 of the concrete or asphalt of about two inches in thickness is poured or otherwise applied to the base layer and over the installed heating units, and finished in the conventional manner. When the units are energized, the heat therefrom radiates through layer 62 to the surface of the concrete driveway, slab or other structure, and warms the surface sufficiently to melt any snow and ice thereon in the vicinity of the embedded heating units.

While the only configuration illustrated herein has been the parallel wire sections 40 connected by the curved ends 42, other configurations can readily be fabricated, using the present structure of heating wire held in the configuration by the strands bonded thereto in the manner previously described. The units may be easily adapted to various size installations by cutting the strands and wire at the desired place and connecting the ends of the heating wire by cold leads to an electrical outlet.

While only one embodiment of the present heating structure has been described in detail herein, various changes and modifications may be made without departing from the scope of the invention.

I claim:

1. A heating structure for embedding in pavement and the like, comprising a heating wire having a metal electrical resistance wire therein and a layer of thermoplastic material surrounding said resistance wire forming the outer layer, said heating wire being arranged in a predetermined configuration of spaced sections interconnected to one another at their ends and defining open areas through which the material of the pavement and the like will readily pass, a plurality of individual strands of thermoplastic material applied separately to and interconnecting said spaced sections for retaining said sections in said predetermined configuration, and a bond formed by fusion between said strands and said thermoplastic outer layer of the heating wire at the point of contact therebetween.

2. A heating structure for embedding in pavement and the like as defined in claim 1 in which said strands are round in cross section and contain a core of relatively firm material to prevent any appreciable stretching of the strands.

3. A heating structure for embedding in pavement and the like as defined in claim 1 in which the layer of thermoplastic material surrounding the resistance wire and the material of the strands are both of polyvinyl chloride.

4. A heating structure for embedding in pavement and the like as defined in claim 1 in which said heating wire includes an insulating layer around said resistance wire, and a protective ground wire disposed around said insulating wire and covered by said layer of thermoplastic material.

5. A heating structure for embedding in pavement and the like as defined in claim 4 in which said wire around said insulation wire is of a braided construction.

6. A heating structure for embedding in pavement and the like as defined in claim 5 in which the layer of thermoplastic material surrounding the resistance wire and the material of the strands are the same composition.

7. A heating structure for embedding in pavement and the like as defined in claim 1 in which said strands are spaced from and parallel with one another.

8. A heating structure for embedding in pavement and the like as defined in claim 7 in which said strands are arranged in pairs and the strands of each pair are spaced from one another.

9. A heating structure for embedding in pavement and the like as defined in claim 8 in which said spaced sections of said heating wire are generally straight and are parallel to one another and curved portions connect adjacent sections to one another.

* * * * *